United States Patent [19]

Greig

[11] 4,375,611

[45] Mar. 1, 1983

[54] PROTECTED SERVOMECHANISM

[75] Inventor: George H. Greig, Kirkcaldy, Scotland

[73] Assignee: Burroughs Corporation, Detroit, Mich.

[21] Appl. No.: 267,315

[22] Filed: May 28, 1981

[30] Foreign Application Priority Data

Jun. 14, 1980 [GB] United Kingdom ............... 8019533

[51] Int. Cl.³ .............................................. G05G 5/00
[52] U.S. Cl. .................................. 318/626; 318/467; 318/565
[58] Field of Search .................... 318/626, 565, 467

[56] References Cited

U.S. PATENT DOCUMENTS

| | | | |
|---|---|---|---|
| 3,403,310 | 9/1968 | Davidoff | 318/626 |
| 3,525,918 | 8/1970 | Parnell | 318/626 X |
| 3,795,853 | 3/1974 | Whitehouse | 318/626 X |
| 3,995,205 | 11/1976 | Klees | 318/626 X |
| 4,122,379 | 10/1978 | Richter et al. | 318/626 X |
| 4,256,999 | 3/1981 | Richter et al. | 318/626 X |

Primary Examiner—B. Dobeck
Attorney, Agent, or Firm—David G. Rasmussen; Kevin R. Peterson; Edmund M. Chung

[57] ABSTRACT

A positioning servomechanism, which is liable to damage, or positions other equipment which is liable to damage if extremeties in its positioning locus are encountered at speed, is protected against uncontrolled and catastrophic acceleration towards these extremeties by the provision of apparatus which shuts off power to the servomechanism in the event of its drive output exceeding a predetermined limit, indicative of saturation, for more than a predetermined time period, power being restored by the application of an external signal.

10 Claims, 2 Drawing Figures

PROTECTED SERVOMECHANISM

BACKGROUND TO THE INVENTION

1. Field of the Invention

The present invention relates to a positioning servomechanism. More particularly, the present invention relates to a positioning servomechanism operating between endstops, where a high speed collision with the endstops would damage the servomechanism itself or the equipment being positioned. Still more particularly, the present invention relates to the style of servomechanism which is used to position a radially mobile transducer over data storage tracks in a disc file. In greatest particularity, the present invention relates to an externally controlled servomechanism in a disc file where provision is made to avoid damage in the event of the external controller, or the servomechanism itself, developing a fault condition.

2. The Prior Art

The use of servomechanisms to position radially mobile read/write heads over data storage tracks, on discs in disc files is a well known art. The head is moved between endstops representing the least and greatest radii of its range. The read/write head is generally fragile, and is mounted on flimsy flexures. In the event of the servomechanism causing the head to collide violently with either of its endstop positions, the resultant short stopping distance, with attendantly high deceleration forces, may cause damage to the head, the head flexures, or the servomechanism actuator itself. In addition, there is usually provided a head unloading ramp, up which the head is parked when removed from the surface of the disc. Collision of the head with this ramp at high speed places the head in extreme risk of sustaining damage.

The trend towards higher performance disc files has resulted in the abandoning of relatively safe but slow stepping motor head positioning servomechanisms in favour of faster magnetic linear or rotary actuators, where a force proportional to current positions the head under the control of positional feedback information and externally applied demand and control signals. Should any fault develop in the servomechanism or the equipment providing demand and control signals, then there is a risk that the actuator will be accelerated uncontrollably towards one or other of its endstops. The relatively high cost of heads renders an original fault, most probably the result of a low cost failure, an unexpectedly costly fault to repair by necessitating the replacement of heads.

It is also the trend that microprocessors are used to command and control head positioning servomechanisms. Should malfunction or external influence disrupt the operation of the microprocessor, it is quite capable of entering a series of random, uncontrolled states in which commands may be sent to the servomechanism which, if obeyed, would result in damage and destruction.

It is therefore desirable that a method and apparatus be provided whereby the drive signals resulting from a fault condition in either the servomechanism itself or the external controller thereto may be overridden in the event of their being likely to cause damage, and the action of the servomechanism rendered harmless.

SUMMARY OF THE INVENTION

1. Object of the Invention

It is an object of the present invention to provide a servomechanism with protecting apparatus whereby the output of the servomechanism drive to the actuator is monitored for saturation, and when that saturation is detected as lasting for more than a predetermined period, drive is inhibited to the actuator.

2. Description of the Preferred Embodiment

In a preferred embodiment of the present invention, a power amplifier, part of a positioning servomechanism, has its outputs monitored for positive and negative saturation levels, and if either of these levels persists for longer than a predetermined period, the power amplifier is disabled, and kept disabled until externally re-enabled.

The operation of the present invention, together with further aims and objectives thereon, will be further understood by consideration of the following description in conjunction with the appended drawing.

DETAILED DESCRIPTION OF THE PREFERRED EMBODIMENT

Figure 1:
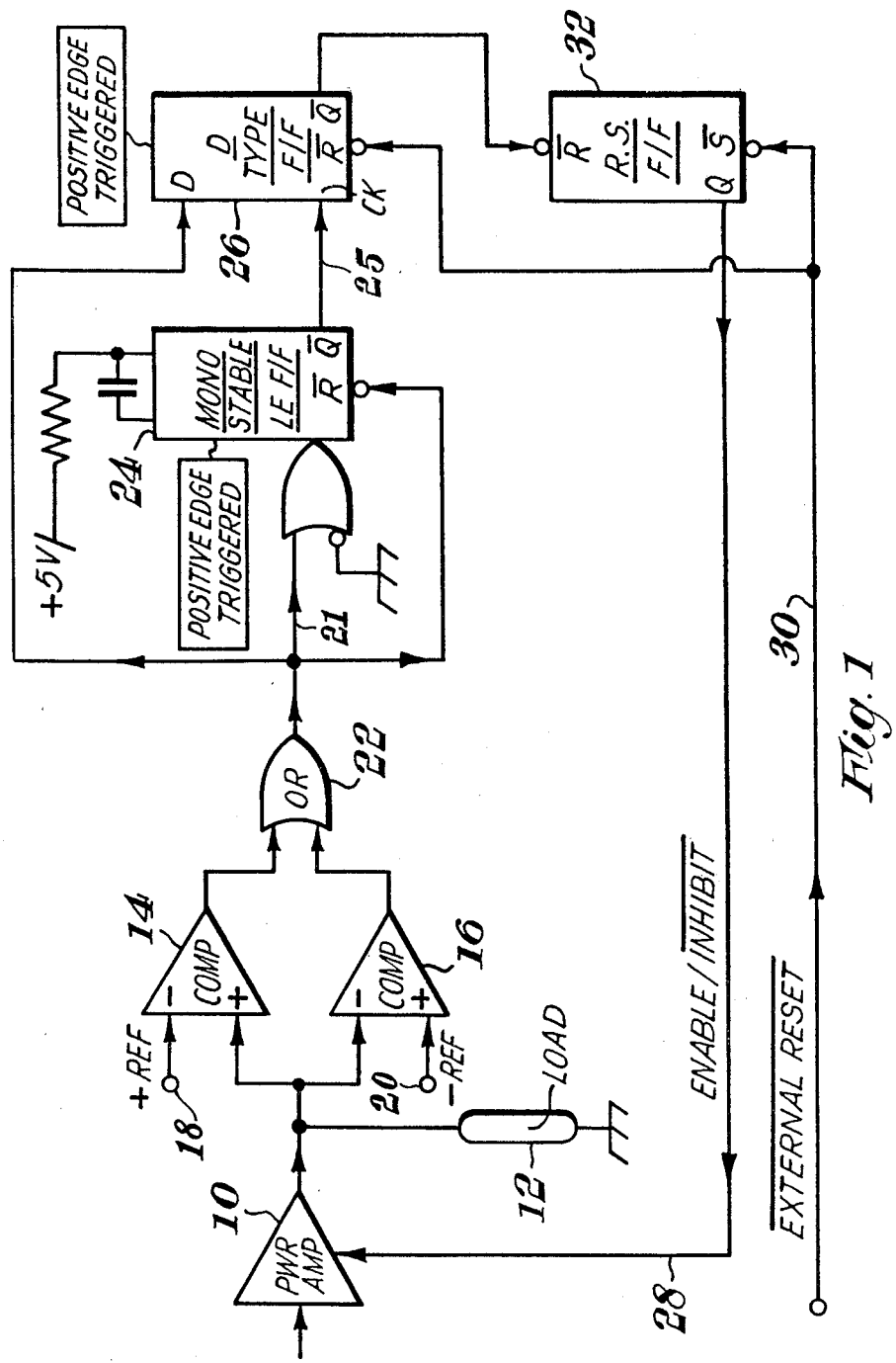
FIG. 1 shows the system of the preferred embodiment of the present invention.

An inhibitable power amplifier 10, being part of a positioning servomechanism is provided with an inhibiting input on its inhibiting connector 28 which, when logically true, allows the amplifier 10 to function normally, but when logically false, disables and shuts down the amplifier 10 bringing and holding its output to zero.

The amplifier 10 delivers its output, within its function as part of a positioning servomechanism, to the coil of the servomechanism actuator 12. The servomechanism, shown in FIG. 2, also includes a positional feedback transducer, and compensation and control elements, all well known in the art and constituting no part of the instant invention.

The output of the power amplifier 10 is also delivered as an input to a positive saturation comparator 14 and a negative saturation comparator 16. The positive saturation comparator 14 is provided, on its inverting input 18 with a positive reference voltage, just a little less in magnitude than the output voltage of the power amplifier 10 when it is saturated in the positive direction. The output of the positive saturation comparator 14 is logically false if the output of the power amplifier 10 is less positive than the positive reference voltage, and logically true, indicatively of positive saturation, if the output of the power amplifier 10 is more positive than the positive reference voltage.

In a precisely similar manner, the output of the power amplifier 10 is monitored for negative saturation by the negative saturation comparator 16. This comparator 16 is provided, on its non-invertin input 20, with a negative reference voltage which is a little less in magnitude than the output of the power amplifier 10 when it is saturated in the negative direction. The negative saturation comparator 16 provides an output, indicatively of negative saturation of the power amplifier 10, which is logically true if and only if the output of the power amplifier 10 is more negative than the negative reference voltage.

The outputs of the positive and negative saturation comparators 14 & 16 are coupled as simultaneous inputs to an OR gate 22, whose output is true if either of its inputs is logically true. The output of the OR gate 22 being logically true is thus indicative of the output of the power amplifier 10 being in either positive or negative saturation.

The output of the OR gate 22 is coupled simultaneously as the triggering input and the resetting input to a positive edge triggered monostable timer 24, which is reset by a logically false level being presented at its resetting input 23. Whenever the output of the OR gate 22 is logically false, the monostable timer 24 is preemptively reset, so that its inverted output 25 assumes a true level. Whenever the output of the OR gate is logically true, the monostable timer 24 ceases to be reset, and is triggered into its timeout operation by the rising edge of the logically false to logically true transition of the output of the OR gate 22, presented at the triggering input 21. Whenever the timing cycle is in progress, the output 25 of the monostable 24 assumes a logically false condition. At the end of a timing period, the output 25 of the monostable 24 reverts to a logically true condition. A timing cycle is terminated by the act of resetting the monostable 24.

The output 25 of the monostable 24 is provided as the clocking input to a positive edge triggered, D-type flipflop 26 the output of the OR gate 22 is also provided as the data input to the D-type flipflop 26. Whenever a logically false to logically true transition occurs on its clocking input, the D-type flipflop 26 provides and holds, as its output 27 the logical inverse of the signal provided at its data input at the instant of the clocking transition.

The output 27 of the D-type 26 is provided as the resetting input to a set/reset flipflop 32. An externally provided setting input connector 30 is coupled to the setting input of the set/reset flipflop 32. The output of the set/reset flipflop 32 assumes and retains a logically false value whenever its resetting input is taken logically false, and assumes and retains a logically true value whenever its setting input is taken logically false.

The output of the set/reset flipflop 32 is coupled to the inhibiting input of the power amplifier 10.

In the operation of the preferred embodiment, the output of the set/reset flipflop 32 is firstly made logically true by the application of a resetting signal on the external connector 30 in the logically false condition. This signal is thereafter returned to the logically true condition, the output of the set/reset flipflop 32 remaining in a logically true condition, thus enabling the operation of the power amplifier 10. At any time thereafter, should the output of the power amplifier 10 become more positive or negative than either of its limits, these being the positive and negative reference voltages, the monostable 24 is triggered into its timeout.

The output 25 of the monostable 24, in triggering, goes from logically true to logically false. Should the output of the OR gate 22 return to a false condition before the end of the timeout, the output 25 of the monostable 24 is instantly reset, going from logically false to logically true. The true to false transition triggers the D-type flipflop 26 which presents, as its output, the inverse of the output of the OR gate 22. Since the output of the OR gate 22 is logically false, having just reset the monostable 24, the clocked output of the D-type flipflop 26 is logically true. The true level at the output 27 of the D-type flipflop 26 does not set the set/reset flipflop 32, and the action of the power amplifier is thus maintained if the power amplifier 10 comes out of saturation before the end of the timeout period.

The output 25 of the monostable 24 also goes automatically from logically false to logically true at the end of the timeout cycle. If the amplifier 10 remains in saturation for more than the timeout period, the output of the OR gate 22 is still logically true at the instant the output of the monostable changes. The D-type flipflop 26 is triggered by the change, and in clocking through the inverse of the output of the OR gate 22, provides a logically false output. The logically false output of the D-type flipflop 26 causes the set/reset flipflop 32 to be reset, and so provide and retain a logically false output.

The logically false output of the set/reset flipflop 32 disables the power amplifier 10 beginning and holding the power amplifier 10 output to zero, and thus removing all drive to the actuator 12. The power amplifier 10 remains thus shutdown until an external resetting signal of a logically false value is applied to the setting input of the set/reset flipflop 32.

The value of the timeout of the monostable 24 is selected to be longer than any period of saturation anticipated in the normal operation of the servomechanism, and is thus related to the unity gain frequency and damping factor of the servomechanism.

Figure 2:
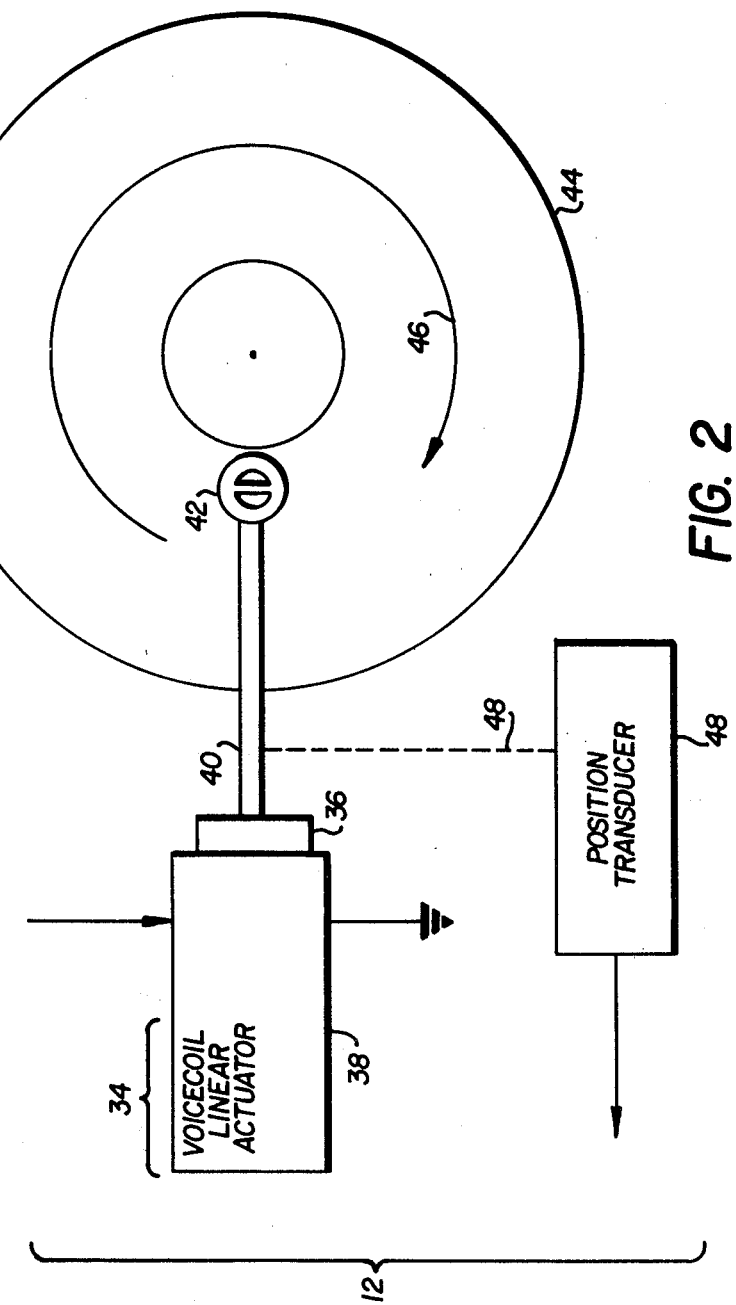
FIG. 2 shows the coil acutated by the servo-mechanism.

FIG. 2 shows the load 12 of FIG. 1. The load 12 comprises a voicecoil actuator 34 in receipt of energy from the power amplifier 10 of FIG. 1. The actuator 34 comprises a moving coil assembly 36 in a magnet assembly 38. When current flows in the coil 36 it experiences a displacement force proportional in magnitude and direction to the size and sense of the current flow.

An arm 40 couples the coil 36 to a magnetic data recording head 42 to position the head 42 at selectable radii on a data storage disc 44 rotatable as indicated by the arrow 46 so that the head 42 can be used to record or recover useful data signals on the disc 44 at any selectable one of a plurality of concentric data-storage tracks.

A position transducer 48 is coupled via a mechanical coupling 50 to the arm 40 to provide an output indicative of the radius of the head 42 on the disc 44. In the operation of the overall servomechanism and in a manner well-known in the art of servomechanism design the output of the transducer 48 is subtracted from the externally provided demand signal and the result of that subtraction coupled as the input to the power amplifier 10 to control the radius of the head 42 in sympathy with the external demand signal. The transducer can be of any kind. As an example of use, the invention can be employed in the Burroughs B-9480 disc drive where the transducer 48 is an optical grating detente transducer. The described use of the invention in positioning a magnetic disc drive's head 42 over the disc 44 is illustrative of and not restrictive to the invention, and is provided for the better understanding thereof.

It is to be appreciated that many variant embodiments exist. In particular the comparators 14 & 16 are replaceable by numerous other types of devices, and the voltage levels for comparison are selectable as being other than saturation levels. The externally provided setting signal may originate from a manual switch or some monitoring device. The logically false condition of the output of the set/reset flipflop 32 may be used to activate indication of a shutdown. The set/reset flipflop 32 may be omitted, and the output 27 of the D-type flipflop 26 taken directly to the inhibiting input of the amplifier.

The D-type flipflop may be replaced by a sequential logic network.

What is claimed is:

1. A positioning servomechanism comprising:
   a power amplifier providing motive energy to a position-controller load movable along a path including an endstop;
   an inhibitor for causing said amplifier to cease providing said motive energy in response to a control input;
   a monitor having the output level of said amplifier coupled as its output;
   said monitor being operable to compare said output level against an upper limit and a lower limit, to provide an output indicative of said level having been outside said upper or lower limits for longer than a predetermined period said predetermined period being shorter than the time required for said load to acquire sufficient kinetic energy to destructively collide with said endstop, and to provide said output as said control input to said inhibitor, such that, upon receipt of said output from said monitor, said inhibitor causes said amplifier to cease providing said motive energy.

2. A servomechanism, as recited in claim 1, wherein said monitor comprises,
   a first comparator, with said output of said amplifier coupled to its comparison input, said upper limit coupled to its reference input, and providing output indicative of said output of said amplifier being greater than said upper limit,
   a second comparator, also with said output of said amplifier coupled to its comparison input, said lower limit coupled to its reference input, and providing output indicative of said output of said amplifier being less than said lower limit,
   a timer, to which said outputs of said comparators are coupled as inputs initiated by the provision of output by either of said comparators, reset by both comparators simultaneously providing no output, and providing an output indicate of predetermined time interval, after said initiation, neither having elapsed or been reset,
   and, a logic network, to which the outputs of said comparators and said timer are coupled as inputs, and which provides output in the event of the loss of said indication by said timer whilst either of said comparators is still providing output,
   said output of said logic network being provided as the output of said monitor.

3. A servomechanism, as recited in claim 2, wherein said logic network includes, as its output element,
   a resettable latch, said latch being set on the first occurrence of said loss of said indication of said timer when either of said comparators is still providing output,
   said output of said latch being provided as the output of said logic network, and
   said latch being reset by an externally coupled resetting signal.

4. A servomechanism, as recited in claim 1, wherein said monitor includes, as its output element,
   a resettable latch, said latch being set on the first occurrence output of said amplifier having been outwith said limits for longer than said predetermined period,
   said output of said latch being provided as the output of said monitor, and
   said latch being reset by an externally coupled resetting signal.

5. A servomechanism, as recited in claim 3 wherein said output of said latch is externalised from said servomechanism to provide activation for electrical, aural or visual indication of a shutdown condition being in progress on said amplifier.

6. A servomechanism, as recited in claim 4, wherein said output of said latch is externalised from said servomechanism to provide activation for electrical, aural or visual indication of a shutdown condition being in progress on said amplifier.

7. A servomechanism, as recited in claim 5, wherein said external resetting signal is coupled via manually operable resetting means.

8. A servomechanism, as recited in claim 6, wherein said external resetting signal is coupled via manually operable resetting means.

9. A servomechanism as recited in claim 7, used to position a radially mobile transducer over rotating, memory storage media in a disc file.

10. A servomechanism, as recited in claim 8, used to position a radially mobile transducer over rotating memory storage media in a disc file.

* * * * *